United States Patent
Hayashida et al.

(10) Patent No.: US 7,578,072 B2
(45) Date of Patent: Aug. 25, 2009

(54) DIGITAL INDICATOR AND METHOD FOR USING THE DIGITAL INDICATOR

(75) Inventors: Shuji Hayashida, Kawasaki (JP); Aki Hiroshima, Kawasaki (JP); Rie Arai, Kawasaki (JP); Takefumi Kiwada, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 141 days.

(21) Appl. No.: 11/984,981

(22) Filed: Nov. 26, 2007

(65) Prior Publication Data

US 2008/0120862 A1 May 29, 2008

(30) Foreign Application Priority Data

Nov. 28, 2006 (JP) .............................. 2006-320716

(51) Int. Cl.
*G01B 3/22* (2006.01)

(52) U.S. Cl. .......................................... 33/832; 33/701

(58) Field of Classification Search .................. 33/556, 33/558, 559, 561, 701, 784, 762, 833, 834, 33/836, 838
See application file for complete search history.

(56) References Cited

U.S. PATENT DOCUMENTS

| | | | | |
|---|---|---|---|---|
| 3,334,419 A | * | 8/1967 | Jaye ............................. 33/702 |
| 3,996,669 A | * | 12/1976 | Anichini ..................... 33/501.6 |
| 4,109,200 A | * | 8/1978 | McNulty ................ 324/207.18 |
| 4,593,473 A | * | 6/1986 | Shimomura ................... 33/832 |
| 5,333,390 A | * | 8/1994 | Petterson et al. .............. 33/706 |
| 2008/0104855 A1 | * | 5/2008 | Kim et al. ...................... 33/836 |

FOREIGN PATENT DOCUMENTS

| | | |
|---|---|---|
| EP | 0 107 338 A2 | 5/1984 |
| GB | 2 136 572 A | 9/1984 |
| JP | A-56-163409 | 12/1981 |
| JP | A-2003-344004 | 12/2003 |

* cited by examiner

*Primary Examiner*—R. A. Smith
(74) *Attorney, Agent, or Firm*—Oliff & Berridge, PLC

(57) ABSTRACT

A digital indicator (1) includes: a main body (10); a spindle (11) being axially slidable and having a contact portion (12) on one end, the contact portion abutting a to-be-measured portion; a detector (13) that detects an absolute displacement amount of the spindle (11) relative to the main body (10); and a display (14) that digitally displays the displacement amount of the spindle (11) relative to the main body (10) detected by the detector 13. The spindle (11) is slidable in a direction away from the contact portion (12) beyond the detectable range of the detector (13).

2 Claims, 4 Drawing Sheets

DIGITAL INDICATOR AND METHOD FOR USING THE DIGITAL INDICATOR

BACKGROUND OF THE INVENTION

1. Field of the Invention

The present invention relates to a digital indicator for measuring a dimension and the like of a to-be-measured article and a method for using the digital indicator.

2. Description of Related Art

Indicators provided with a spindle have been used as a measuring device for measuring a dimension and the like of a to-be-measured article.

The general indicators include pointer indicators that display a displacement amount of the spindle by a rotation angle of the pointer as well as digital indicators that electrically detect and display a displacement amount of the spindle.

Such a digital indicator is provided with a main body, a spindle penetrating an outer circumferential wall of the main body and supported to be slidable in an axial direction thereof, an encoder (a detector) for detecting a sliding amount of the spindle and a display digitally displaying a displacement amount of the spindle relative to the main body.

For example, JP-A-2003-344004 (the second embodiment) discloses a digital indicator in which a main body and a bearing that is provided on the main body and slidably supports a spindle are integrally molded with conductive synthetic resin in order to protect an electric circuit from magnetism outside.

The detector used in the digital indicators may be an electrostatic-capacitance, electromagnetic or optical encoder. For instance, the detector may be an encoder including an electrostatic-capacitance scale provided along an axial direction of the spindle and a detector head that is provided on the main body and is capacitively-coupled with the scale to detect a displacement amount of the spindle. Such a conventional encoder measures a current displacement amount by incrementing a displacement from a reference point of the scale.

FIG. 2(A) schematically shows a positional relationship between the scale and the detector head of the digital indicator.

As shown in FIG. 2(A), a scale 15 opposes to a detector head 16 that detects the displacement of the scale 15. The displacement of the spindle can be acquired by incrementing the detected displacement of the scale 15.

However, as shown in FIG. 2(B), when the spindle is excessively slid upward, the scale 15 goes beyond the detector head 16. Hence, the detector head 16 cannot detect the displacement of the scale 15, which causes a failure of the detector, so that the displacement of the spindle cannot be obtained. Accordingly, the conventional digital indicator is arranged to have a slidable range of the spindle in which the scale 15 cannot go beyond the detector head 16 i.e. a slidable range equal to a detectable range of the encoder. Note that "a" shown in FIG. 2(A) indicates the slidable range of the spindle and the detectable range of the encoder.

The conventional digital indicator has a following problem.

FIGS. 3 and 4 show a measurement of a thickness of a bottom of a glass 2 using the digital indicator.

To measure the bottom thickness of the glass 2, initially a contact portion 12 of a spindle 11 is brought into abutment on a floor surface 3 to conduct zero-setting. Next, as shown in FIG. 3, the spindle 11 is slid upward until the contact portion 12 is positioned above the height of a wall of the glass 2. While the spindle 11 is maintained at the position, the glass 2 is horizontally moved until the bottom of the glass 2 is positioned below the spindle 11. As shown in FIG. 4, the spindle 11 is then slid downward until the contact portion 12 abuts on the bottom surface of the glass 2, whereby obtaining the thickness of the bottom of the glass 2 from a value displayed on a display 14.

Although the slidable range of the spindle 11 needs to be larger than the height of the wall of the glass 2 in such a measurement, the slidable range of the spindle in the conventional digital indicator is equal to the detectable range of the encoder. Hence, even when the length of a to-be-measured portion (the bottom of the glass 2) is small, a costly and bulky indicator having a large detectable range is required.

SUMMARY OF THE INVENTION

An object of the present invention is to solve the above-mentioned problem by providing a compact and inexpensive digital indicator that can be used for various to-be-measured articles having various shapes and a method for using the digital indicator.

A digital indicator according to an aspect of the present invention includes: a main body; a spindle provided to the main body, being slidable in an axial direction and having a contact portion on one end, the contact portion abutting to a to-be-measured portion; a detector detecting an absolute displacement amount of the spindle relative to the main body; and a display displaying the displacement amount of the spindle relative to the main body detected by the detector. The spindle is slidable in a direction to the opposite side of the contact portion beyond the detectable range in which the detector can perform detection.

According to the aspect of the invention, since the detector is adapted to detect the absolute displacement amount of the spindle relative to the main body and the spindle is adapted to slide in the direction away from the contact portion 12 beyond the detectable range "a" of the detector, the detector can properly function even though the spindle is slid in the direction away from the contact portion beyond the detectable range "a". Hence, even when the spindle has once slid in the direction away from the contact portion to a position out of the detectable range "a", the measurement can be continuously conducted provided the spindle is subsequently returned to the detectable range "a".

In other words, the digital indicator according to the present invention is arranged to have a large slidable range "b" of the spindle relative to the detectable range "a" of the detector, so that the digital indicator can be used for various to-be-measured articles having different shapes while the size of the digital indicator is maintained compact. Therefore, the digital indicator can be suitably used in a measurement where the detectable range "a" is small but the slidable range "b" of the spindle needs to be large, such as a measurement of the bottom thickness of the glass.

A method for using a digital indicator according to an aspect of the invention is a method for using the above-described digital indicator that includes: a first detection step in which the contact portion abuts on the to-be-measured portion and a first detection value is read from a display on the display; an over-sliding step conducted subsequent to the first detection step, in which the spindle is slid in the direction away from the contact portion beyond the detectable region in which the detector can perform detection; and a second detection step conducted subsequent to the over-sliding step, in which the contact portion abuts on another to-be-measured portion and a second detection value is read from a display on the display.

According to the aspect of the invention, since the above-described digital indicator is used, even when the spindle is slid in the direction away from the contact portion beyond the detectable range of the detector in the over-sliding step, the detector can properly function so that the first detection value read in the first detection step is comparable with the second detection value read in the second detection step.

Hence, the digital indicator can be suitably used in a measurement where the detectable range can be small but the slidable range of the spindle needs to be large, such as a measurement of the bottom thickness of the glass.

DETAILED DESCRIPTION OF PREFERRED EMBODIMENT(S)

An embodiment according to the invention will be described below with reference to the drawings.

Figure 1:
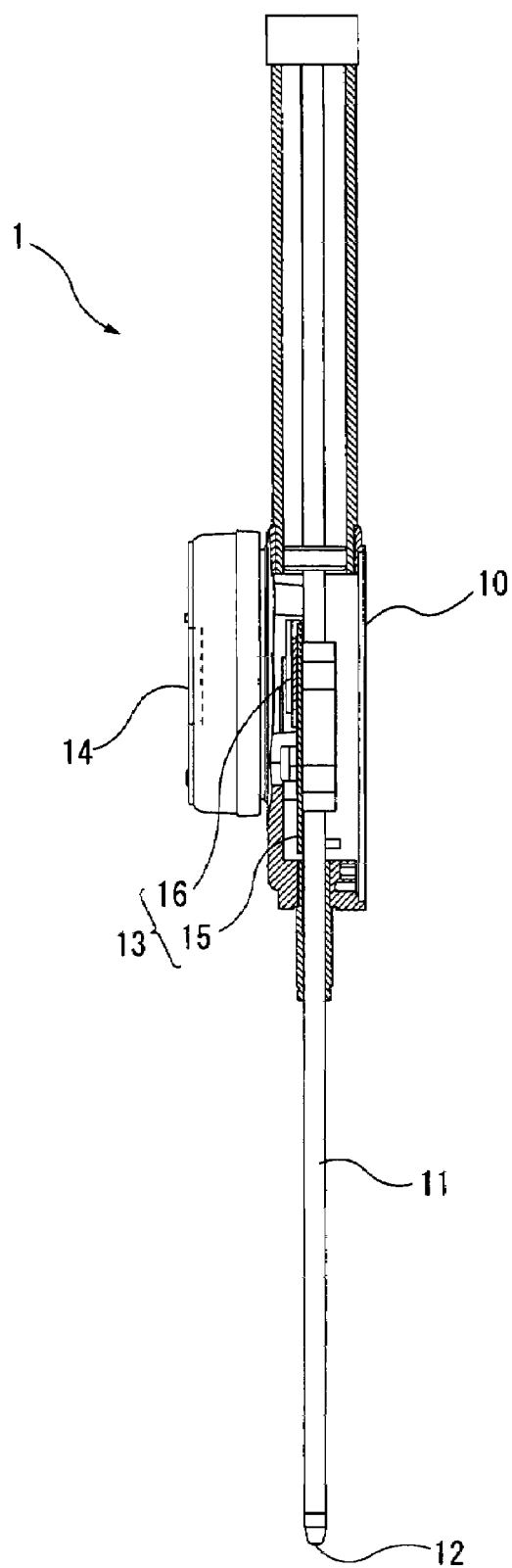
FIG. 1 is a cross section of a digital indicator of an embodiment of the invention when seen from a lateral side of the digital indicator.

FIG. 1 is a cross section of a digital indicator 1 of the embodiment when seen from a lateral side of the digital indicator 1.

As shown in FIG. 1, the digital indicator 1 includes: a main body 10; a spindle 11 being axially slidable and having a contact portion 12 on one end, the contact portion abutting a to-be-measured portion; a detector 13 that detects an absolute displacement amount of the spindle 11 relative to the main body 10; and a display 14 that digitally displays the displacement amount of the spindle 11 relative to the main body 10 detected by the detector 13.

The detector 13 is an electrostatic-capacitance encoder that includes: an electrostatic-capacitance scale 15 provided along the axial direction of the spindle 11; and a detector head 16 capacitively-coupled with the scale 15 in the main body 10 to detect the absolute displacement amount of the spindle 11.

Figure 2:
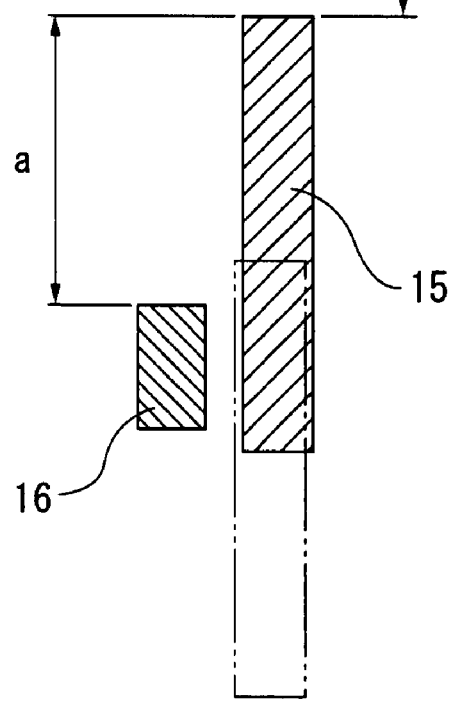
FIG. 2 schematically shows a positional relationship between a scale and a detector head of the digital indicator of the embodiment.
Figure 2:
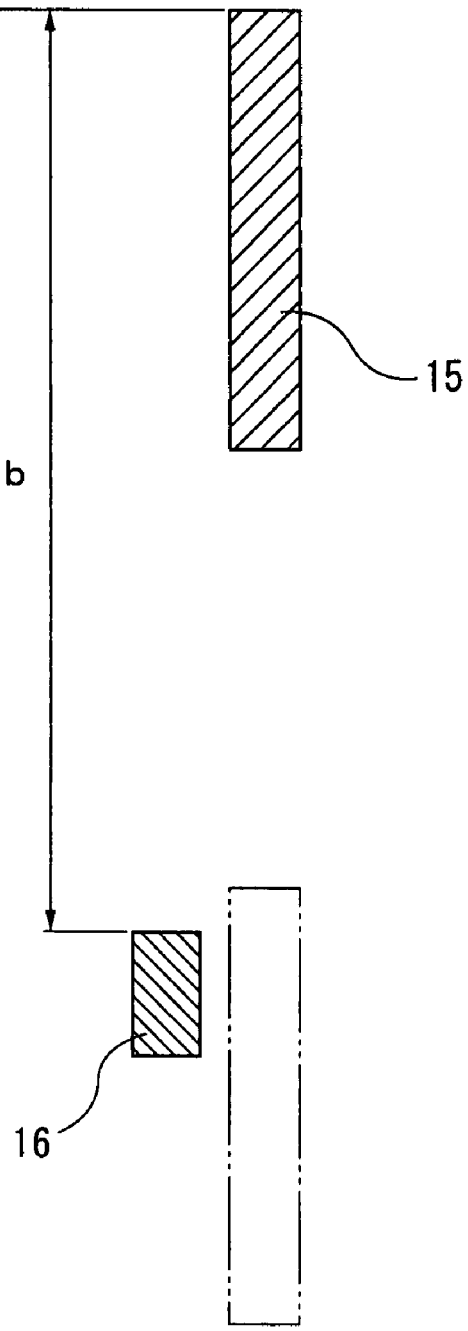

FIG. 2 schematically shows a positional relationship between the scale 15 and the detector head 16.

In FIG. 2(A), "a" indicates a detectable range of the encoder, and "b" indicates a slidable range of the spindle 11. As shown in FIG. 2, the spindle 11 (not shown) has an arrangement where the scale 15 opposes the detector head 16 and the spindle 11 is slidable within the range "b" in a direction away from the contact portion 12 beyond the detectable range "a" in which the detector 13 can detect displacement of the spindle 11.

Next, a method for using the above-described digital indicator 1 will be described.

Figure 3:
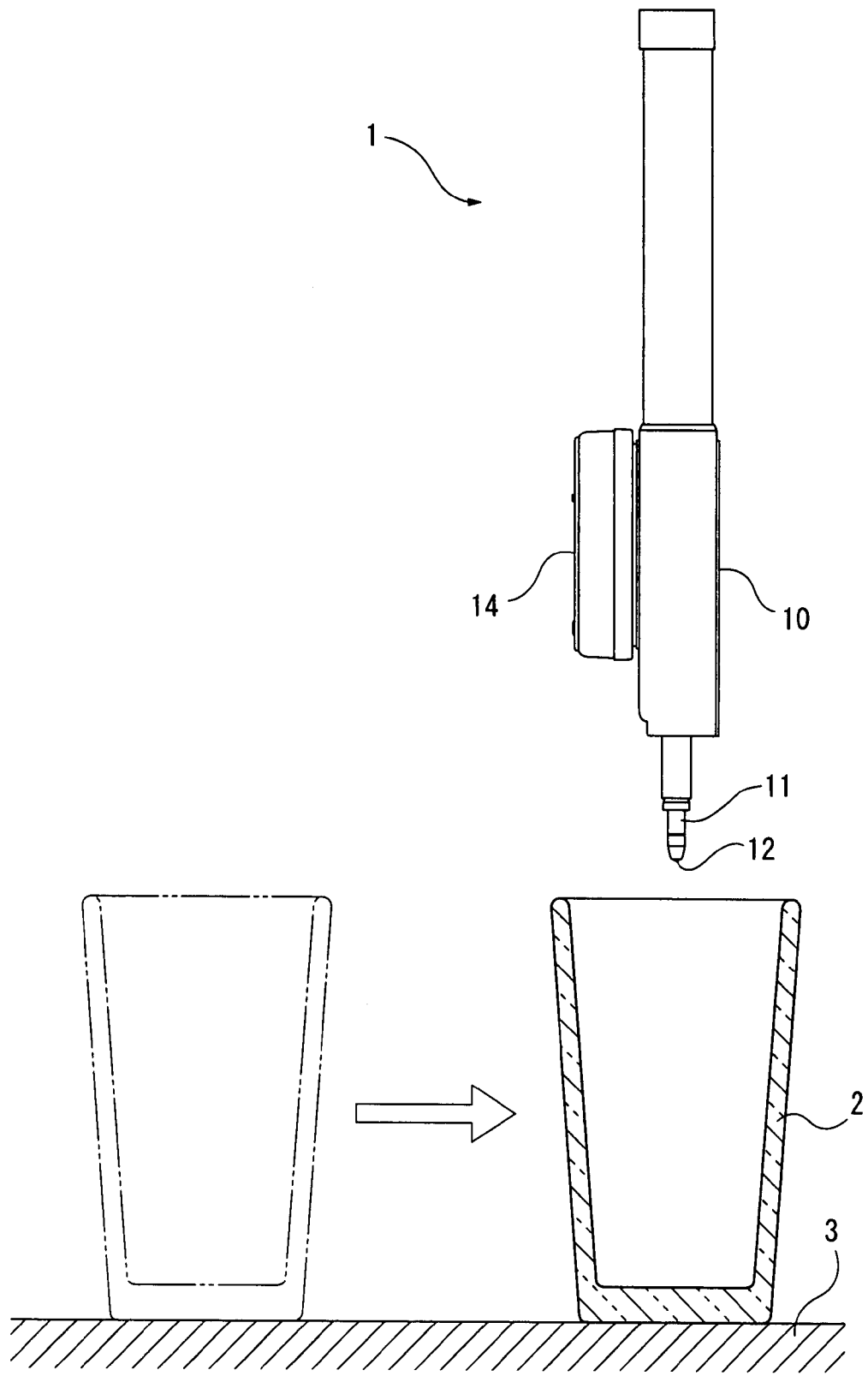
FIG. 3 shows a measurement of a thickness of a bottom of a glass in which the digital indicator of the embodiment is used.
Figure 4:
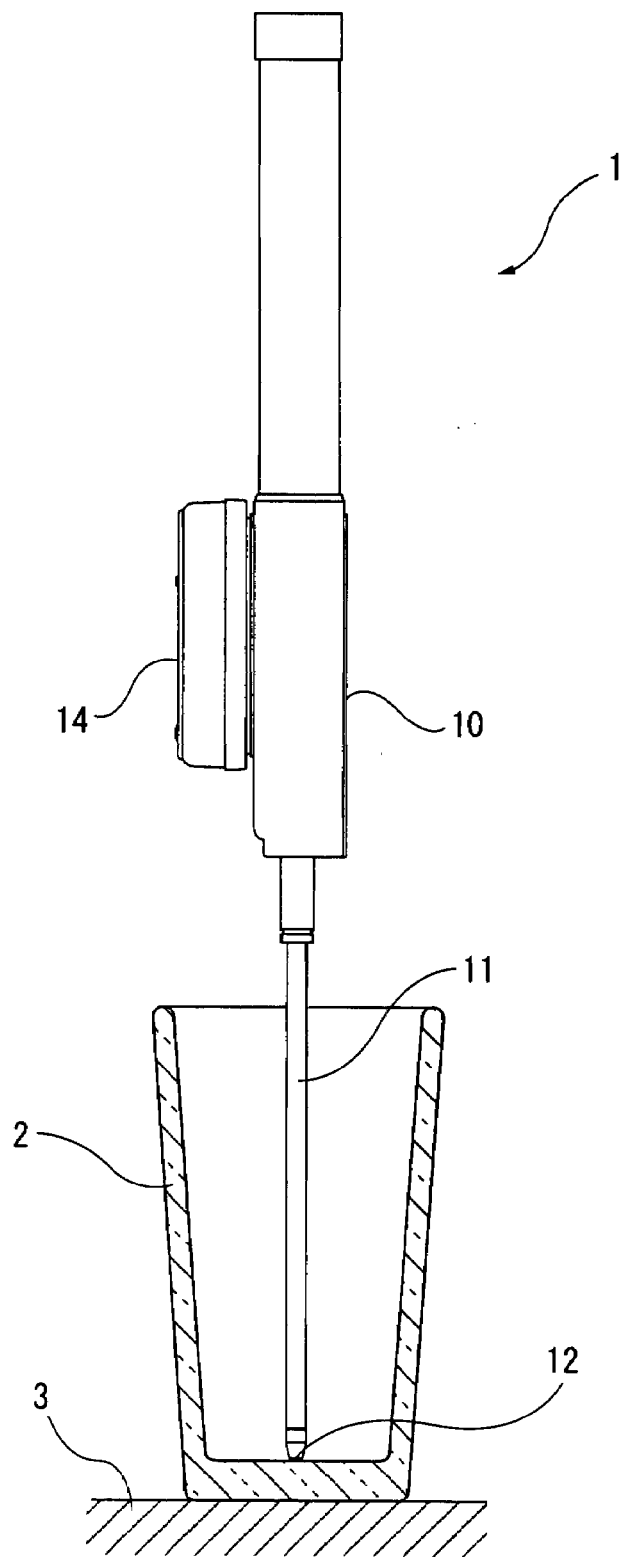
FIG. 4 shows the measurement of the thickness of the bottom of the glass in which the digital indicator of the embodiment is used.

FIGS. 3 and 4 show a measurement of a thickness of a bottom of a glass 2 using the digital indicator 1.

Initially, the contact portion 12 of the spindle 11 is brought into abutment on a floor surface 3 for zero-setting (a first detection step). Next, as shown in FIG. 3, the spindle 11 is slid upward until the contact portion 12 is positioned above the height of a wall of the glass 2 (an over-sliding step). While the spindle 11 is maintained at the position, the glass 2 is horizontally moved until a bottom surface of the glass 2 is positioned below the spindle 11. As shown in FIG. 4, the spindle 11 is then slid downward until the contact portion 12 abuts on the bottom surface of the glass 2, whereby obtaining the thickness of the bottom of the glass 2 from a value displayed on the display 14 (a second detection step).

The embodiment can provide following advantages.

(1) Since the detector 13 is adapted to detect the absolute displacement amount of the spindle 11 relative to the main body 10 and the spindle 11 is adapted to slide in the direction away from the contact portion 12 beyond the detectable range "a" of the detector 13, the detector 13 can properly function even when the spindle 11 is slid in the direction away from the contact portion 12 beyond the detectable range "a". Hence, even when the spindle 11 has once slid in the direction away from the contact portion 12 beyond the detectable range "a", the measurement can be continuously conducted provided the spindle 11 is subsequently returned to the detectable range "a".

In other words, the digital indicator 1 according to the present invention is arranged to have a larger slidable range "b" for the spindle relative to the detectable range "a" of the detector 13, so that the digital indicator 1 can be used for various to-be-measured articles having different shapes while the size of the digital indicator 1 is maintained compact. Therefore, the digital indicator 1 can be suitably used in a measurement where the detectable range "a" is small but the slidable range "b" of the spindle needs to be large, such as a measurement of the bottom thickness of the glass 2.

(2) Since the digital indicator 1 in which the detector 13 detects the absolute displacement amount of the spindle 11 relative to the main body 10 and the spindle 11 is slidable in the direction away from the contact portion 12 beyond the detectable range "a" of the detector 13 is used, the detector 13 can properly function even when the spindle 11 is slid in the direction away from the contact portion 12 beyond the detectable range "a" in the over-sliding step. Accordingly, a first detection value read in the first detection step is comparable with a second detection value read in a second detection step.

Hence, the digital indicator 1 can be suitably used in a measurement where the detectable range "a" can be small but the slidable range "b" of the spindle needs to be large such as a measurement of the bottom thickness of the glass 2.

It should be noted that the invention is not limited to the above-described embodiment but includes other arrangements and the like as long as an object of the invention can be attained. For instance, a below-exemplified modification is included in the scope of the invention.

Although the digital indicator 1 is provided with an electrostatic-capacitance encoder as the detector 13 in the above-described embodiment, the detector 13 may be any encoder as long as an absolute displacement amount of the spindle 11 relative to the main body 10 can be detected.

For example, the detector 13 may be an electromagnetic-induction or optical encoder that can detect an absolute displacement amount of the spindle 11. With this arrangement, the same advantages as those of the above embodiment can be acquired.

The priority application Number JP 2006-320716 upon which this patent application is based is hereby incorporated by reference.

What is claimed is:
1. A digital indicator, comprising:
a main body;

a spindle provided to the main body, being slidable in an axial direction and having a contact portion on one end, the contact portion abutting to a to-be-measured portion;

a detector detecting an absolute displacement amount of the spindle relative to the main body; and a display displaying the displacement amount of the spindle relative to the main body detected by the detector, wherein the spindle is slidable in a direction to the opposite side of the contact portion beyond the detectable range in which the detector can perform detection.

2. A method for using the digital indicator according to claim 1, comprising:

a first detection step in which the contact portion abuts on the to-be-measured portion and a first detection value is read from a display on the display;

an over-sliding step conducted subsequent to the first detection step, in which the spindle is slid in the direction away from the contact portion beyond the detectable region in which the detector can perform detection; and a second detection step conducted subsequent to the over-sliding step, in which the contact portion abuts on another to-be-measured portion and a second detection value is read from a display on the display.

* * * * *